US009501487B1

(12) United States Patent
Yuan et al.

(10) Patent No.: US 9,501,487 B1
(45) Date of Patent: Nov. 22, 2016

(54) CHANGE TREE INCREMENTAL BACKUP

(71) Applicant: EMC Corporation, Hopkinton, MA (US)

(72) Inventors: Hsing Yuan, Palo Alto, CA (US); Suchit Kaura, San Ramon, CA (US); Hymanand Nellore, Foster City, CA (US); Joseph Jobi, Winnemucca, NV (US); Sandeep Joshi, Campbell, CA (US); Moiz Haidry, Campbell, CA (US); Ravi Venkata Batchu, Cupertino, CA (US); Narain Coimbatore Ramadass, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 249 days.

(21) Appl. No.: 14/320,311

(22) Filed: Jun. 30, 2014

(51) Int. Cl.
*G06F 17/30* (2006.01)
*G06F 11/14* (2006.01)

(52) U.S. Cl.
CPC ..... *G06F 17/30088* (2013.01); *G06F 11/1448* (2013.01)

(58) Field of Classification Search
CPC ............. G06F 17/30194; G06F 17/30215; G06F 17/30575; G06F 17/30073; G06F 17/30174; G06F 11/1451; G06F 11/1458; G06F 11/1464; G06F 11/1459; G06F 2201/84; G06F 12/121; G06F 17/30; G06F 9/505; G06F 9/5033; G06F 17/30008; G06F 11/1448
See application file for complete search history.

(56) References Cited

U.S. PATENT DOCUMENTS

| 7,103,616 | B1 * | 9/2006 | Harmer | G06F 17/30902 707/E17.12 |
| 7,334,095 | B1 * | 2/2008 | Fair | G06F 3/0607 711/161 |
| 7,624,106 | B1 * | 11/2009 | Manley | G06F 17/30115 707/786 |
| 8,150,805 | B1 * | 4/2012 | Tawri | G06F 21/6218 711/162 |

(Continued)

OTHER PUBLICATIONS

Yong Kyu Lee et al.—"Metadata Management of the SANtopia File System"—Electronics and Telecommunications Research Institute(ETR1) of Korea—Published in: Parallel and Distributed Systems, 2001. ICPADS 2001. Proceedings. Eighth International Conference on—Date of Conference: 2001Kyongju City—pp. 492-499.*

(Continued)

*Primary Examiner* — Anh Ly
(74) *Attorney, Agent, or Firm* — Krishnendu Gupta

(57) ABSTRACT

Implementations are provided herein for incremental backup using a change tree. A change tree is a database file for tracking file system changes of a specific dataset, such as a directory of a file system. A backup process can create and/or initiate a change tree when creating a backup snapshot of a dataset. After the change tree is created, all file system changes inside the dataset can be tracked. The next incremental backup can then take advantage of the change tree to backup changes without traversing the entire dataset. Thus, incremental backups can be more efficient and are better able to keep up with tape streaming speed.

12 Claims, 8 Drawing Sheets

(56) References Cited

U.S. PATENT DOCUMENTS

| | | | |
|---|---|---|---|
| 8,200,632 B2* | 6/2012 | Schack | G06F 11/1435 707/639 |
| 2008/0046474 A1* | 2/2008 | Sismanis | G06F 17/30306 707/E17.014 |
| 2008/0046476 A1* | 2/2008 | Anderson | G06F 17/30088 707/E17.01 |
| 2008/0059541 A1* | 3/2008 | Fachan | G06F 17/30088 707/E17.01 |
| 2008/0243954 A1* | 10/2008 | Augenstein | G06F 11/1451 707/E17.007 |
| 2009/0055604 A1* | 2/2009 | Lemar | G06F 11/1435 711/161 |
| 2009/0055607 A1* | 2/2009 | Schack | G06F 11/1435 711/162 |
| 2009/0228511 A1* | 9/2009 | Atkin | G06F 17/30076 707/E17.044 |
| 2009/0327218 A1* | 12/2009 | Passey | G06F 17/30091 707/E17.044 |
| 2010/0306786 A1* | 12/2010 | Passey | G06F 9/542 719/314 |
| 2012/0102088 A1* | 4/2012 | Bindal | G06F 11/1461 709/203 |
| 2014/0074787 A1* | 3/2014 | Berman | G06F 11/1451 707/639 |
| 2014/0074790 A1* | 3/2014 | Berman | G06F 17/3007 707/649 |
| 2014/0122428 A1* | 5/2014 | Zhou | G06F 17/30179 707/623 |

OTHER PUBLICATIONS

Keun Soo Yim, Jihong Kim, and Kern Koh—"A Fast Start-Up Technique for Flash Memory Based Computing Systems" SAC'05, Mar. 13-17, 2005, Santa Fe, New Mexico, USA 2005 ACM Symposium on Applied Computing Proceeding SAC '05 Proceedings of the 2005 ACM symposium on Applied computing—pp. 843-849.*

* cited by examiner

CHANGE TREE INCREMENTAL BACKUP

FIELD OF THE INVENTION

This invention relates generally to backing up data, and more particularly to systems and methods for creating, updating, and using a change tree for incremental backup.

BACKGROUND OF THE INVENTION

Network Data Management Protocol (NDMP) is a mechanism and a protocol to move data between primary storage and secondary storage. It is used by network-attached storage ("NAS") systems to back up and/or restore data. As the capacity of data stored on NAS systems increases due to industry demand and corresponding technological advances, backing up these storage systems becomes more challenging. For example, although the amount of data to be backed up tends to increase as the capacity of a NAS system increases, in general, the backup window allotted for performing backups does not change. This can be because backups are run during off-peak hours of NAS usage so as not to compete for system resources with non-backup users during peak hours.

One means for providing more efficient backup solutions is through incremental backup. In general, rather than backing up every object in a NAS storage system, incremental backup backs up only those objects that have changed since the previous backup. During a typical incremental backup of a dataset, a backup server traverses through the dataset by doing a treewalk and compares the change time of each object, e.g., a file or directory, against a time value, e.g., the last backup time. If an object's change time is greater than the time of the last backup, then the object is selected for backup. This treewalk process checks every object in the dataset no matter how many objects changed since the last backup. However, by checking every object of the dataset, the backup system, in most use cases, will end up checking objects that do not need to be backed up. One example consequence of such inefficiency is causing the backup server to fail to match the tape speed of the backup storage device. Thus, for each write to the backup storage tape, the tape drive can be forced to rewind the tape, reposition the tape, speed up the tape, etc. This is called a shoe-shining effect which prevents the tape drive from operating at maximum efficiency. Thus, there exists to continue to optimize incremental backup processes for greater efficiency that can reduce or even prevent the shoe-shining effect.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of modifications to data associated with a logical inode ("LIN") of a file system can be detected. In response to the detecting, a set of snapshot identifiers associated with the LIN and a set of LIN ancestors can be generated. In response to the generating the set of snapshot identifiers, a set of backup snapshot identifiers can be extracted from the set of snapshot identifiers. The LIN, the set of backup snapshot identifiers, and a latest system snapshot identifier can be pushed as a file system change entry to a global first in first out ("FIFO") queue. File system change entries of the global FIFO queue can be processed by: determining a set of change trees associated with the set of backup snapshot identifiers of the file system change entry; and adding a set of entries to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors.

In accordance with another aspect, a request can be received to perform an incremental backup based on a set of change trees, wherein a change tree in the set of change trees is associated with a change tree root directory and wherein entries in a change tree in the set of change trees include at least a LIN, a parent LIN, and a latest snapshot identifier associated with the LIN. A set of backup objects can be determined based on comparing the latest snapshot identifier of entries of a change tree in the set of change trees with a set of backup level snapshot identifiers associated with the LIN; and backing up the set of backup objects.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
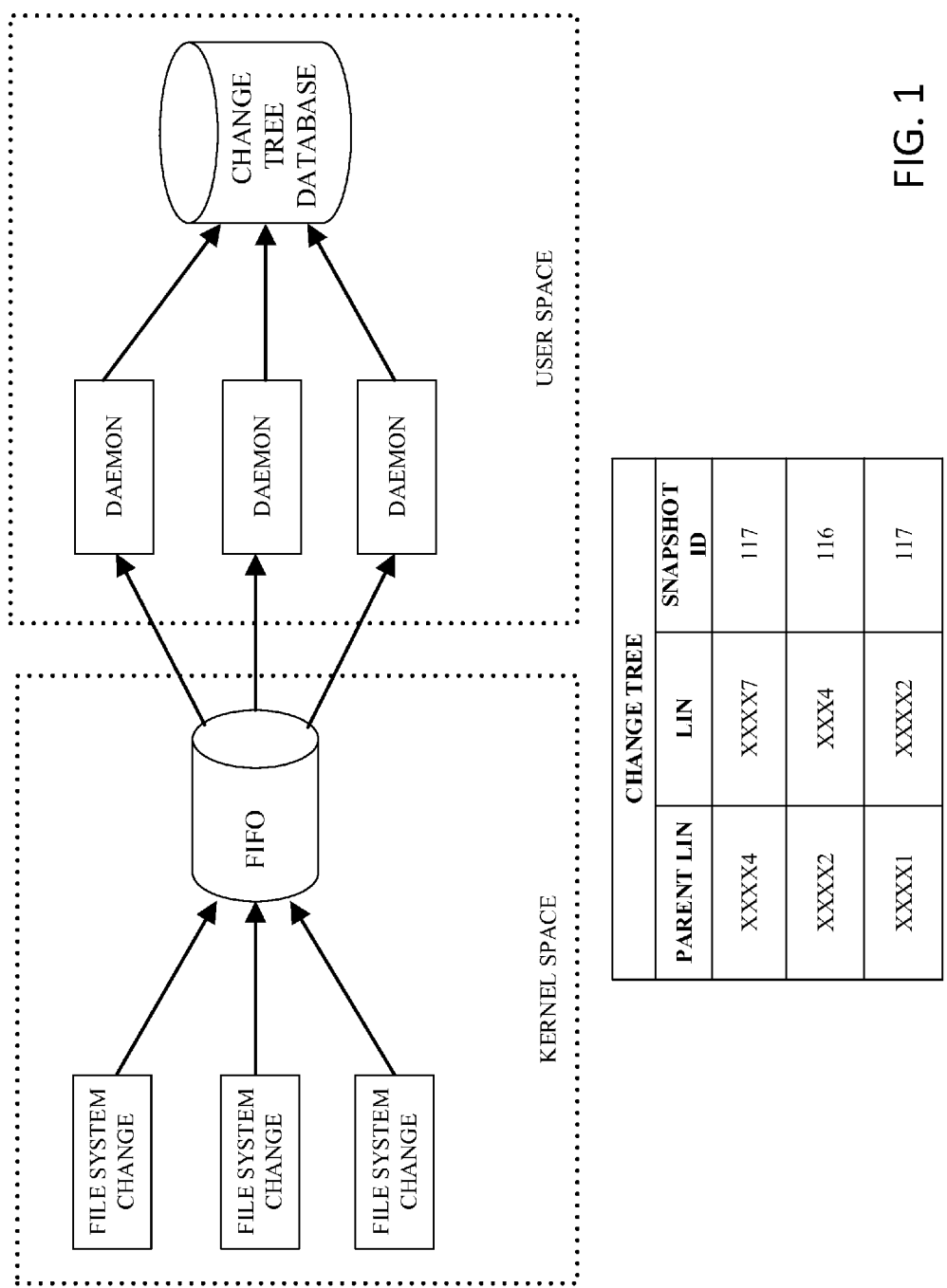
FIG. 1 illustrates an example of a global FIFO queue and populating a change tree database in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, snapshot information, etc. In one implementation, LIN's may be in a known location in a file system, for example, residing in cache memory for fast and/or efficient access by the file system. Before or in conjunction with performing a file system operation on a file or directory, a system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

Implementations are provided herein for incremental backup using a change tree. A change tree is a database file for tracking file system changes of a specific dataset, such as a directory of a file system. A backup process can create and/or initiate a change tree when creating a backup snapshot of a dataset. After the change tree is created, all file system changes inside the dataset can be tracked. The next incremental backup can then take advantage of the change tree to backup changes without traversing the entire dataset. Thus, incremental backups can be more efficient and are better able to keep up with tape streaming speed.

In one implementation, all changed objects can be recorded in a global system first-in-first-out ("FIFO") queue. A painting process, or other snapshot monitoring process providing similar functionality, residing in kernel space, can be used to first identify a LIN that has been changed. Background daemon's in user space can receive the kernel space generated painting process data from the FIFO queue and aggregate that and other LIN data to create, edit, delete, or overwrite entries in the change tree.

Referring now to FIG. 1, there is illustrated an example of a global FIFO queue and populating a change tree database in accordance with implementations of this disclosure. Changes to the file system generally occur in kernel space. For example, as file system changes occur, such as requests to write data, modify data, create data, etc., system calls within the kernel operate in performing such requests. In one implementation, in a distributed file system, such as a node and cluster distributed file system where multiple nodes make up a cluster, and multiple clusters can be linked, a cluster-wide persistent queue or global queue can be used in a FIFO manner to journal file system changes. In another implementation, in the same distributed file system, a per-node FIFO queue can be used to avoid bottlenecks that could occur in a heavily trafficked global FIFO queue. In that implementation, if a node failure occurs, a proxy daemon can be started in the cluster to process the FIFO queue of a failed node.

In an example, in conjunction with normal file system operation, a set of modifications to data can be detected. The data can be associated with a LIN. The LIN can then be examined to generate snapshot identifier information, backup snapshot identifier information, or conceivably any other metadata present within the LIN. The collected data can be termed a "File System Change Entry." The LIN data and any derivative LIN data can then be sent to the global FIFO queue which can then be processed in user space.

In one implementation, when the file system is updating a LIN for modification, the file system can trigger a painting algorithm operation that traverses upward through the directory structure to find snapshots which should be updated for the change. The list of snapshots will only be rebuilt when there is a new snapshot taken between changes, thus, consecutive changes to the same LIN will not keep triggering the painting algorithm if there is no new snapshot taken in the interim. Thus, in one implementation, if a LIN has already been painted, future modifications to the same LIN can be prevented from triggering a file system change entry from entering the FIFO queue.

In one implementation, the painting algorithm is not triggered for newly created LIN's (e.g., a new file). It can be appreciated that the parent LIN will be updated as the parent LIN (e.g., directory) has changed with the addition of the newly created LIN residing in its directory. Thus, a file system change entry can be added to the FIFO queue for the parent LIN. In one implementation, if the newly created LIN is a directory, a file system change entry can be added to the FIFO queue for the newly created directory. In one implementation, when a file or directory is deleted, a file change entry can be added to the FIFO queue under the parent LIN. In one implementation, when a file or directory is moved from one parent to another, it can be treated like a delete operation followed by a create operation, such that file change entries are added to the FIFO queue for the original parent LIN and the new parent LIN.

In some implementations, user space background daemons can be used to process file system change entries received from the global FIFO queue. The background daemon can then use the file system change entries to determine a set of change trees associated with the file system change entry. For example, in one implementation, the set of change trees can be determined based on a set of backup snapshot identifiers that are a part of the file system change entry. If a change tree is found, the daemon can add entries to the change tree. For example, a set of entries can be added to each change tree wherein an entry in the set of entries includes at least a LIN, a parent LIN, and the current snapshot identifier associated with the LIN. The set of entries can include at least entries for the LIN and all the LIN ancestors. It can be appreciated that if multiple backup snapshots are linked to the same change tree, the change tree update is processed only once. It can be appreciated that the change tree can later be used in an incremental backup where snapshot identifiers can be used to determine whether a LIN has been modified since the previous backup.

FIGS. 2-6 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 2:
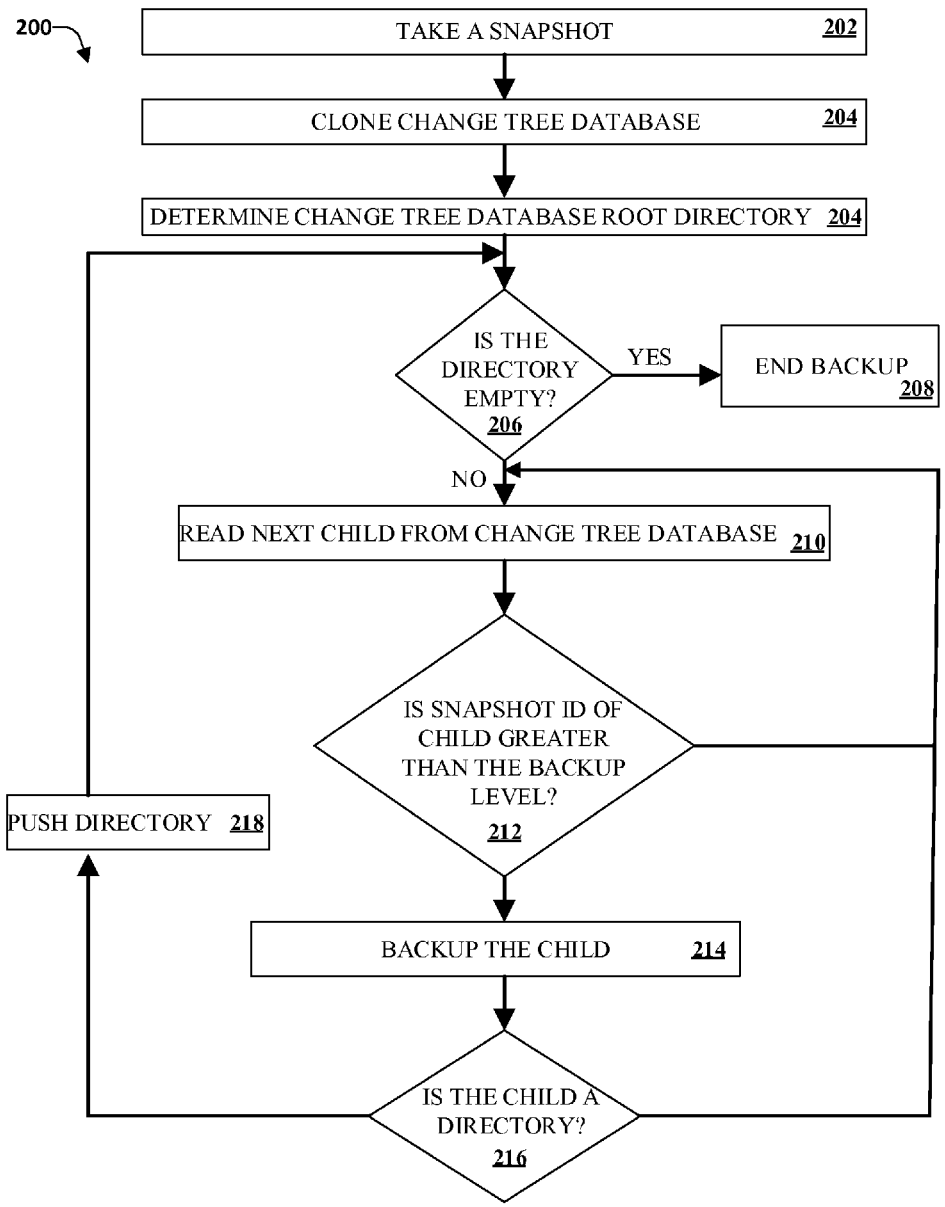
FIG. 2 illustrates an example process for conducting an incremental change tree backup in accordance with implementations of this disclosure.

Referring now to FIG. 2, there is illustrated an example process for conducting an incremental change tree backup in accordance with implementations of this disclosure. During an incremental backup, a change tree is used to find objects for backup. Starting with the LIN of the root directory of the backup, the process finds all children objects of the directory in the change tree database. These are the identified objects to be backed up. It can be appreciated that if a child object identifies a sub-directory, than the backup traverses the sub-directory as well.

In one implementation, a request to perform an incremental backup based on a set of change trees can be received, wherein a change tree in the set of change trees is associated with a change tree root directory and wherein entries in a change tree in the set of change trees include at least a LIN, a parent LIN, and a latest snapshot identifier associated with the LIN. A set of backup objects can be determined based on comparing the latest snapshot identifier of entries of a change tree in the set of change trees with a set of backup level snapshot identifiers associated with the LIN. In one implementation, the determining is based on the latest snapshot identifier of entries of the change tree being greater than the backup level snapshot identifier. The set of backup objects can then be backed up. In one implementation, backing up the set of backup objects includes sending the set of backup objects to a tape drive for storage. It can be appreciated that other data storage drives can also be used in other implementations, such as mechanical drives, flash drives, etc.

In one implementation, the set of change trees can be cloned. For example, by cloning the set of change trees at the onset of the incremental backup process, the cloned change trees can be used within the incremental backup process while the original change trees continue to be updated by ongoing file system changes as described with respect to FIG. 1.

Figure 3:
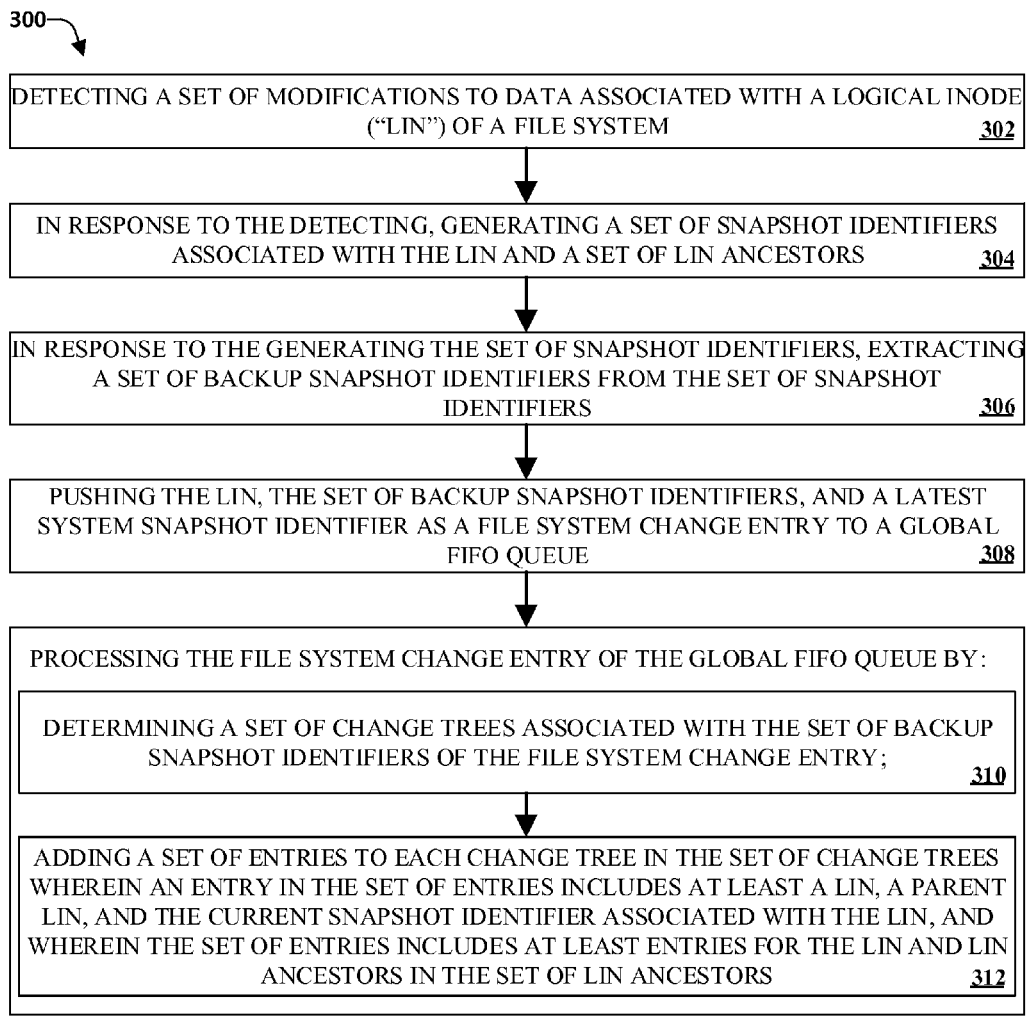
FIG. 3 illustrates an example method of populating a change tree in accordance with implementations of this disclosure.

FIG. 3 illustrates an example method of populating a change tree in accordance with implementations of this disclosure. At 302, a set of modifications to data associated with a logical inode ("LIN") of a file system can be detected. In one implementation, the set of modifications to the LIN include at least one of create or delete the LIN. At 304, in response to the detecting, a set of snapshot identifiers associated with the LIN and a set of LIN ancestors can be generated. In one implementation, when the set of modifications includes creating a LIN or deleting a LIN, the generating the set of snapshot identifiers includes removing snapshot identifiers associated with the created LIN or the deleted LIN from the set of snapshot identifiers. For example, when creating a new object or deleting an existing object, a file system change entry as generated in step 308 can relate to the parent LIN of the created or deleted object, and the FIFO entry can be processed under the parent LIN.

At 306, in response to the generating the set of snapshot identifiers, a set of backup snapshot identifiers can be extracted from the set of snapshot identifiers. At 308, the LIN, the set of backup snapshot identifiers, and a latest system snapshot identifier can be pushed as a file system change entry to a global first-in-first-out ("FIFO") queue.

The file system change entry of the global FIFO queue can be processed at 310 by determining a set of change trees associated with the set of backup snapshot identifiers of the file system change entry. At 312, a set of entries can be added to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors. In one implementation, the set of LIN ancestors includes all ancestors of the LIN.

Figure 4:
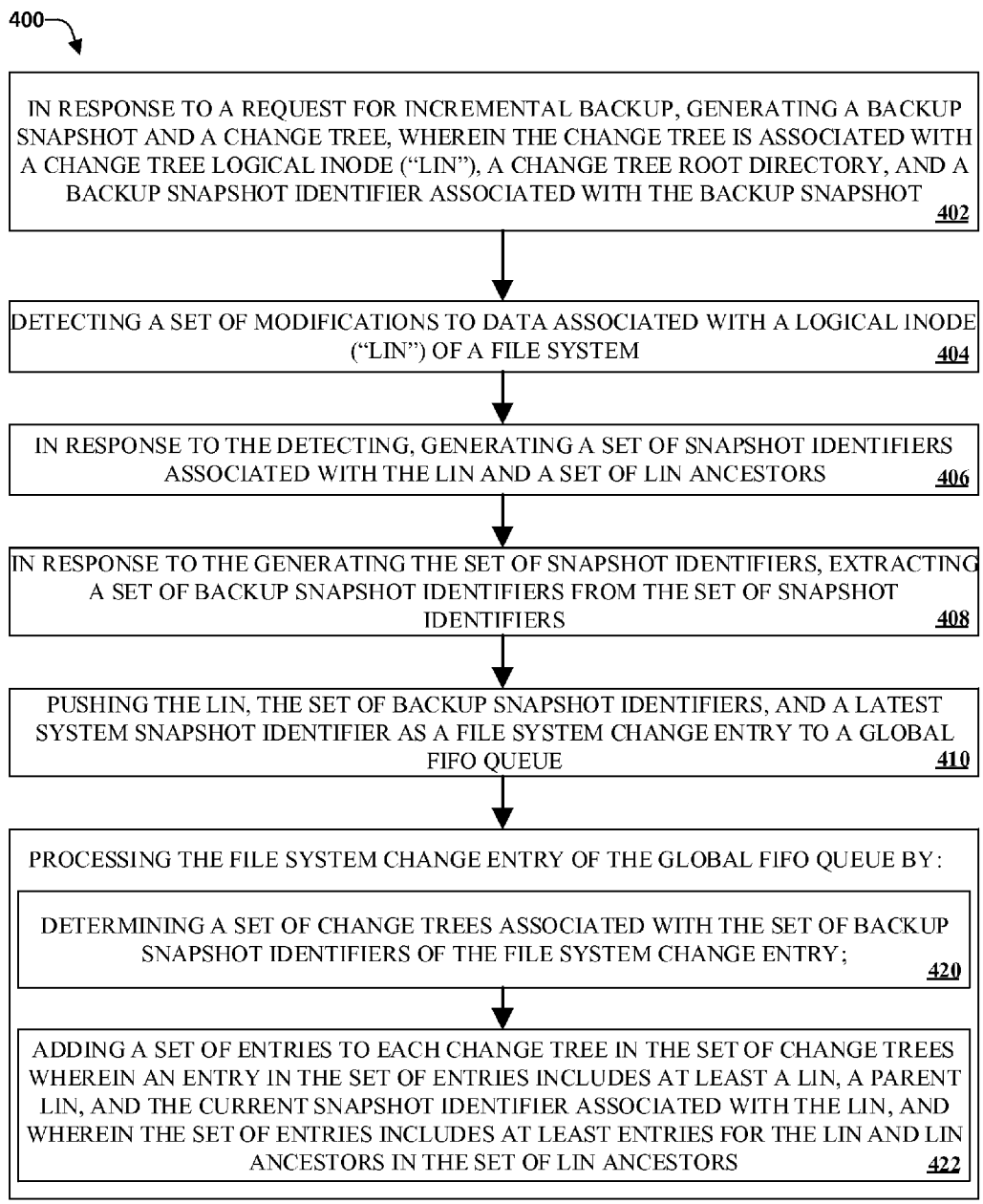
FIG. 4 illustrates an example method of creating and populating a change tree in accordance with implementations of this disclosure.

FIG. 4 illustrates an example method of creating and populating a change tree in accordance with implementations of this disclosure. At 402, in response to request for incremental backup, a backup snapshot and a change tree can be generated wherein the change tree is associated with a change tree LIN, a change tree root directory, and wherein a backup snapshot identifier is associated with the backup snapshot. At 404, a set of modifications to data associated with a LIN of a file system can be detected. At 406, in response to the detecting, a set of snapshot identifiers associated with the LIN and a set of LIN ancestors can be generated. At 408, in response to the generating the set of snapshot identifiers, a set of backup snapshot identifiers can be extracted from the set of snapshot identifiers. At 410, the LIN, the set of backup snapshot identifiers, and a latest system snapshot identifier can be pushed as a file system change entry to a global FIFO queue.

The file system change entry of the global FIFO queue can be processed at 420 by determining a set of change trees associated with the set of backup snapshot identifiers of the file system change entry. At 422, a set of entries can be added to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors.

Figure 5:
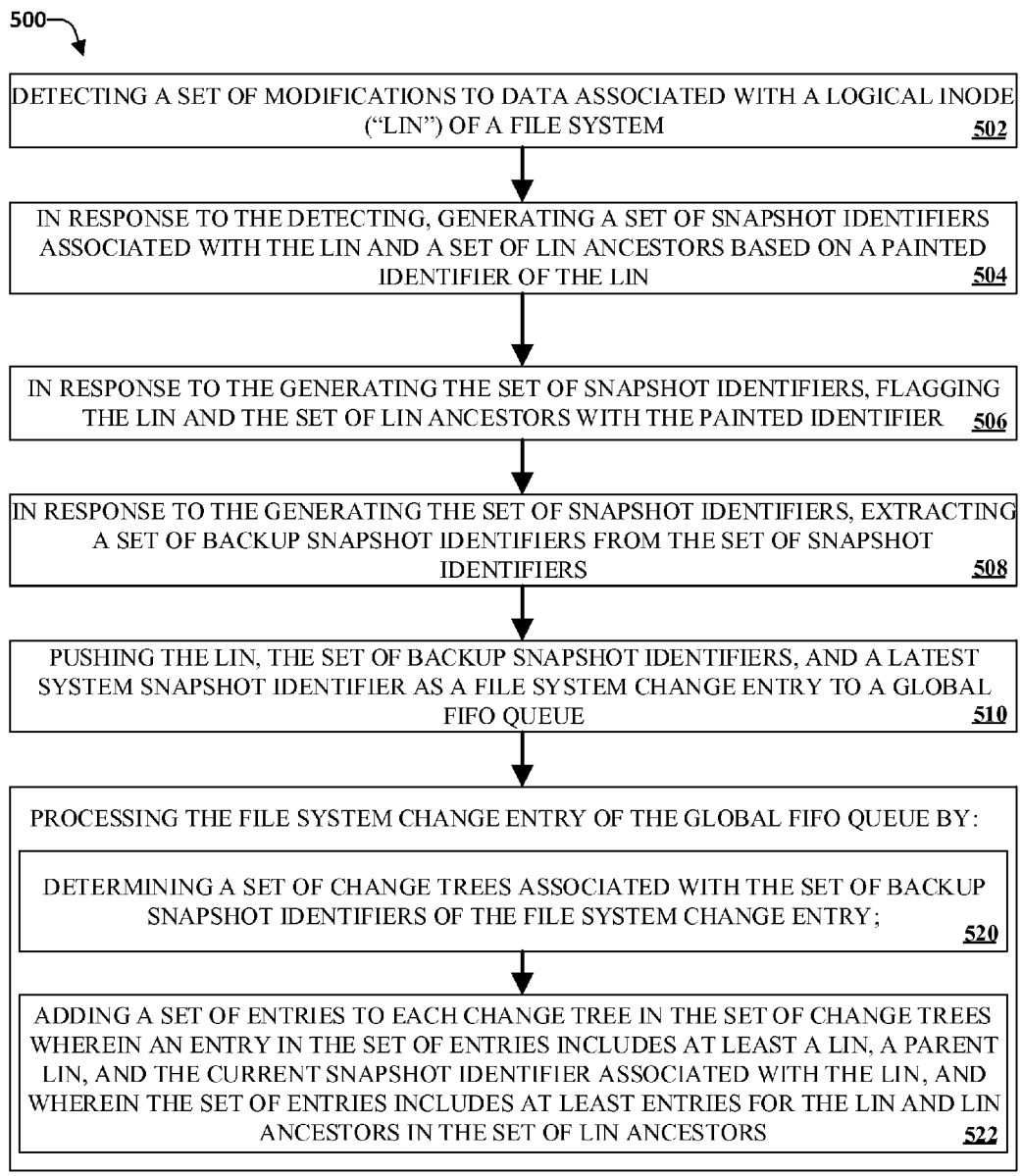
FIG. 5 illustrates an example method of populating a change tree including flagging painted objects in accordance with implementations of this disclosure.

FIG. 5 illustrates an example method of populating a change tree including flagging painted objects in accordance with implementations of this disclosure. At 502, a set of modifications to data associated with a logical inode ("LIN") of a file system can be detected. In one implementation, the set of modifications to the LIN include at least one of create or delete the LIN. At 504, in response to the detecting, a set of snapshot identifiers associated with the LIN and a set of LIN ancestors can be generated based on a painted identifier of the LIN. For example, if the painted identifier indicates that LIN has been painted, then it may not be necessary to generate the set of snapshot identifiers as the LIN has previously been modified and has already been processed as a file system change entry by the FIFO queue. It can be appreciated that all painted identifiers can be removed or wiped clean upon the taking of a snapshot. Thus, it can be appreciated, that processing efficiency can be maximized by not generating file system change entries for LIN's that have been painted, as it can signify that continuing to process a file system change entry is a waste of resources.

At 506, in response to the generating the set of snapshot identifiers, flag the LIN and the set of LIN Ancestors with a painted identifier. It can be appreciated that by flagging the LIN with a painted identifier, as explained with regards to step 504, future modifications to the same LIN can be more efficiently processed. At 508, in response to the generating the set of snapshot identifiers, a set of backup snapshot identifiers can be extracted from the set of snapshot identifiers. At 510, the LIN, the set of backup snapshot identifiers, and a latest system snapshot identifier can be pushed as a file system change entry to a global FIFO queue.

The file system change entry of the global FIFO queue can be processed at 520 by determining a set of change trees associated with the set of backup snapshot identifiers of the file system change entry. At 522, a set of entries can be added to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors.

Figure 6:
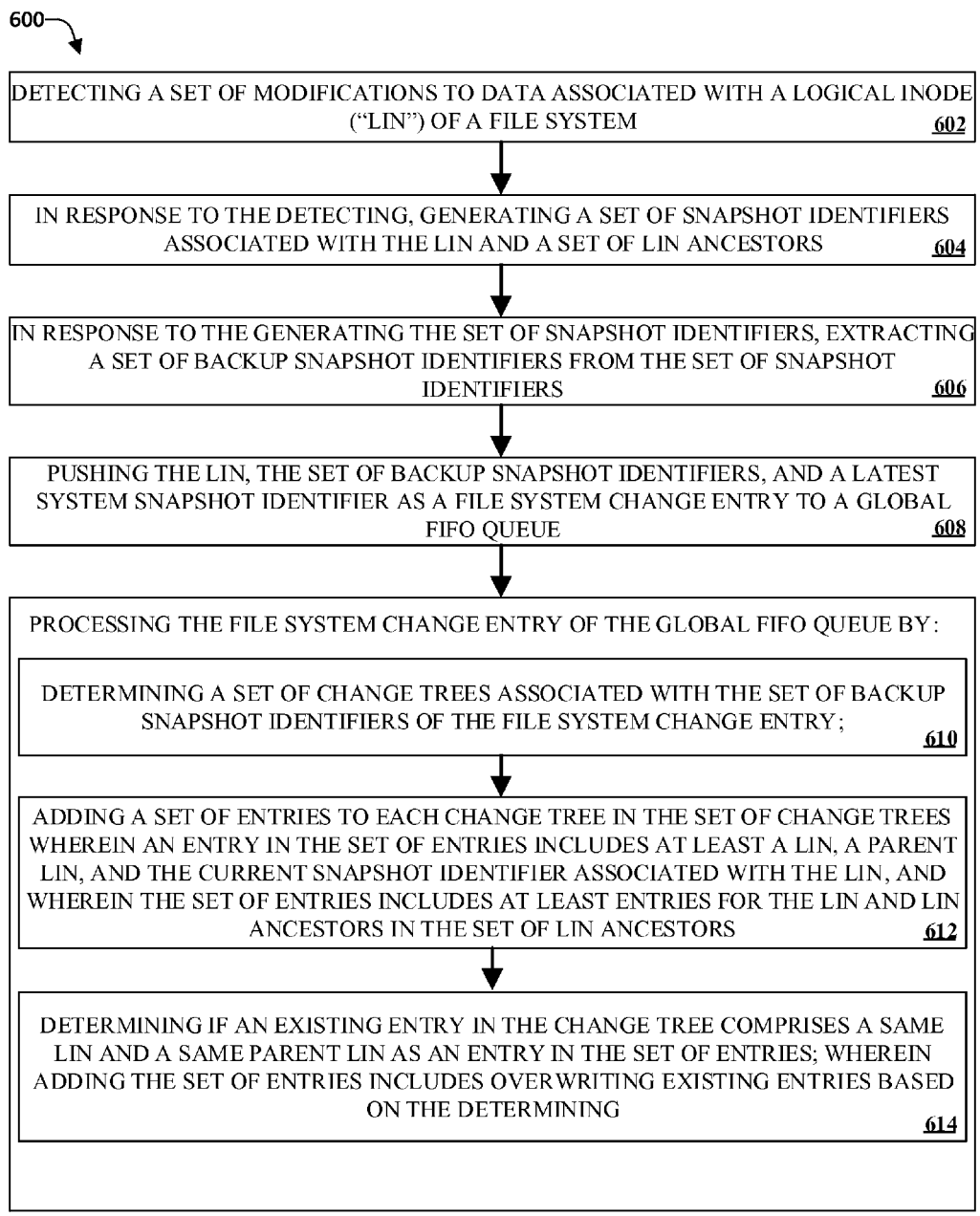
FIG. 6 illustrates an example method of populating a change tree including overwriting stale entries of the change tree in accordance with implementations of this disclosure.

FIG. 6 illustrates an example method of populating a change tree including overwriting stale entries of the change tree in accordance with implementations of this disclosure. At 602, a set of modifications to data associated with a logical inode ("LIN") of a file system can be detected. At 604, in response to the detecting, a set of snapshot identifiers associated with the LIN and a set of LIN ancestors can be generated. At 606, in response to the generating the set of snapshot identifiers, a set of backup snapshot identifiers can be extracted from the set of snapshot identifiers. At 608, the LIN, the set of backup snapshot identifiers, and a latest system snapshot identifier can be pushed as a file system change entry to a global FIFO queue.

The file system change entry of the global FIFO queue can be processed at 610 by determining a set of change trees associated with the set of backup snapshot identifiers of the file system change entry. At 612, a set of entries can be added to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors. At 614, determine if an existing entry in the change tree comprises a same LIN and a same parent LIN as an entry in the set of entries, wherein adding the set of entries at 612 includes overwriting existing entries based on the determining.

Figure 7:
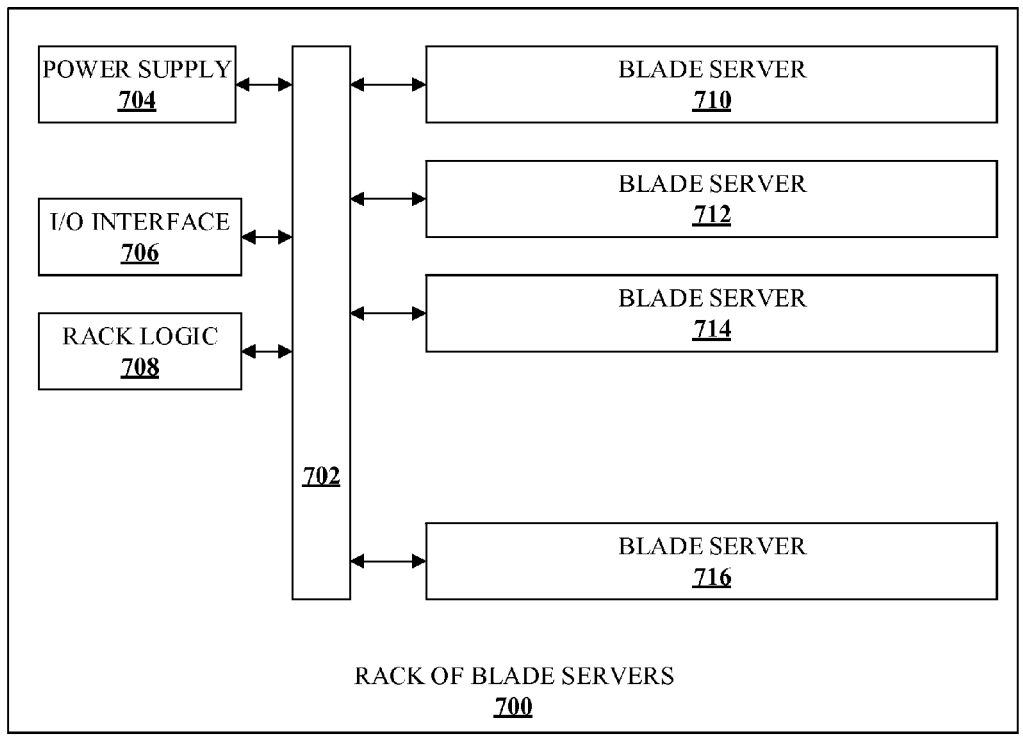
FIG. 7 illustrates an example block diagram of rack of blade servers in accordance with implementations of this disclosure.

FIG. 7 illustrates an example block diagram of rack of blade servers 700 in accordance with implementations of this disclosure. However, the components shown are sufficient to disclose an illustrative implementation. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 700 contains at least a power supply 704, an input/output interface 706, rack logic 708, several blade servers 710, 712, 714, and 716, and backplane 702. Power supply 704 provides power to each component and blade server within the enclosure. The input/output interface 706 provides internal and external communication for components and blade servers within the enclosure. Backplane 708 can enable passive and active communication of power, logic, input signals, and output signals for each blade server.

It can be appreciated that the Rack of Blade Servers 700 can be in communication with a second rack of blade servers and work in conjunction to provide distributed file system. The term blade server can also be used interchangeably with term "node" and can refer to a physical enclosure with a varying amount of CPU cores, random access memory, flash drive storage, magnetic drive storage, etc. For example, a single blade server could contain, in one example, 36 disk drive bays with attached disk storage in each bay.

Figure 8:
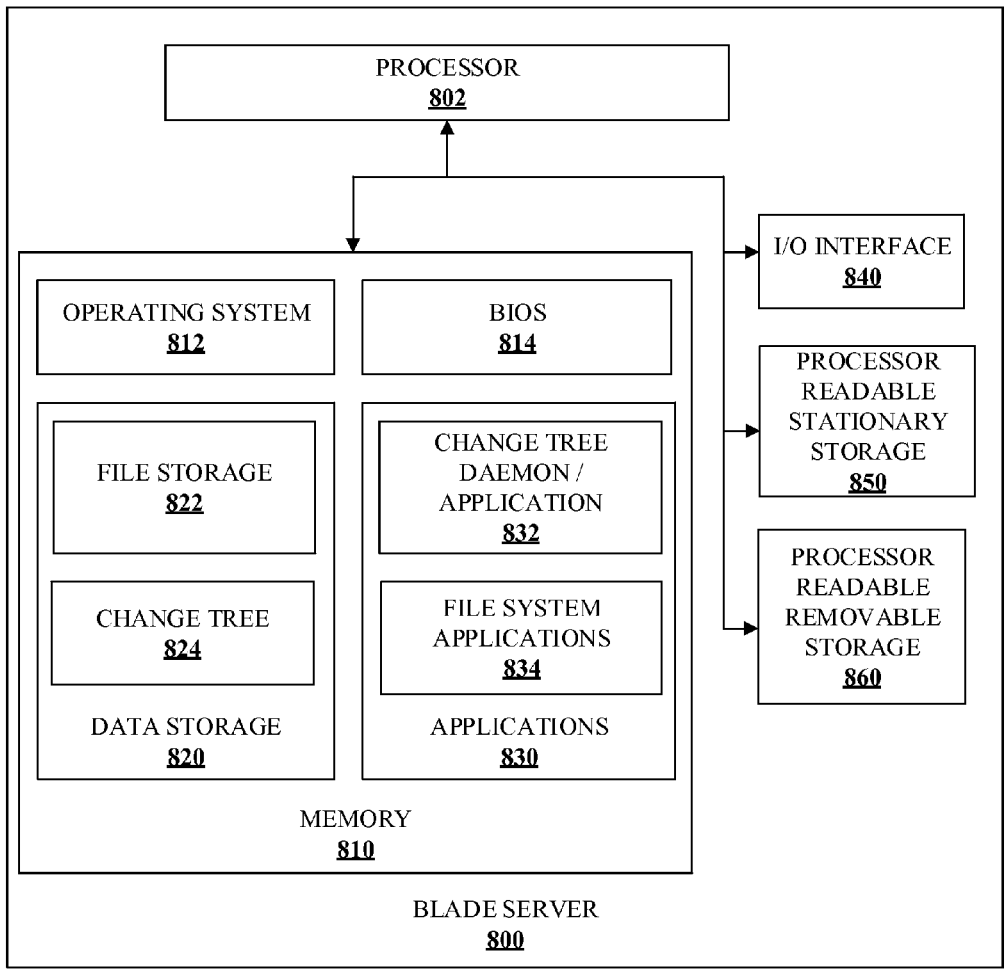
FIG. 8 illustrates an example block diagram of a blade server in accordance with implementations of this disclosure.

FIG. 8 illustrates an example block diagram of a blade server 800 in accordance with implementations of this disclosure. As shown in FIG. 7, a plurality of blade servers may be included in one enclosure that shares resources provided by the enclosure to reduce size, power, and cost.

Blade server 800 includes processor 802 which communicates with memory 810 via a bus. Blade server 800 also includes input/output interface 840, processor-readable stationary storage device(s) 850, and processor-readable removable storage device(s) 860. Input/output interface 840 can enable blade server 800 to communicate with other blade servers, mobile devices, network devices, and the like. Processor-readable stationary storage device 850 may include one or more devices such as an electromagnetic storage device (hard disk), solid state hard disk (SSD), hybrid of both an SSD and a hard disk, and the like. In some configurations, a blade server may include many storage devices. Also, processor-readable removable storage device 860 enables processor 802 to read non-transitive storage media for storing and accessing processor-readable instructions, modules, data structures, and other forms of data. The non-transitive storage media may include Flash drives, tape media, floppy media, disc media, and the like.

Memory 810 may include Random Access Memory (RAM), Read-Only Memory (ROM), hybrid of RAM and ROM, and the like. As shown, memory 810 includes operating system 812 and basic input/output system (BIOS) 814 for enabling the operation of blade server 800. In various embodiments, a general-purpose operating system may be employed such as a version of UNIX, LINUX™, a specialized server operating system such as Microsoft's Windows Server™ and Apple Computer's IoS Server™, or the like.

Applications 830 may include processor executable instructions which, when executed by blade server 800, transmit, receive, and/or otherwise process messages, audio, video, and enable communication with other networked computing devices. Examples of application programs include database servers, file servers, calendars, transcoders, and so forth. Applications 830 may include, for example, file system applications 834, and change tree daemon/application components 832, including incremental backup applications, according to implementations of this disclosure. It can be appreciated that deduplication application component 832 need not reside within blade server 800 for all implementations, as shown and discussed with respect to FIGS. 4-6.

Human interface components (not pictured), may be remotely associated with blade server 800, which can enable remote input to and/or output from blade server 800. For example, information to a display or from a keyboard can be routed through the input/output interface 840 to appropriate peripheral human interface components that are remotely located. Examples of peripheral human interface components include, but are not limited to, an audio interface, a display, keypad, pointing device, touch interface, and the like.

Data storage 820 may reside within memory 810 as well, storing file storage 822 data such as metadata or LIN data. It can be appreciated that LIN data and/or metadata can relate to rile storage within processor readable stationary storage 850 and/or processor readable removable storage 860. For example, LIN data may be cached in memory 810 for faster or more efficient frequent access versus being stored within processor readable stationary storage 850. In addition, Data storage 820 can also host change tree data 824 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   detecting a set of modifications to data associated with a logical inode ("LIN") of a file system;
   in response to the detecting, generating a set of snapshot identifiers associated with the LIN and a set of LIN ancestors;
   in response to the generating the set of snapshot identifiers, extracting a set of backup snapshot identifiers from the set of snapshot identifiers;
   pushing the LIN, the set of backup snapshot identifiers, and a latest system snapshot identifier as a file system change entry to a global First In First Out ("FIFO") queue; and
   processing the file system change entry of the global FIFO queue by
   determining a set of change trees associated with the set of backup snapshot identifiers of the file system change entry;
   adding a set of entries to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors; and
   determining if an existing entry in each change tree comprises a same LIN and a same parent LIN as an entry in the set of entries; wherein adding the set of entries includes overwriting existing entries based on the determining.

2. The method of claim 1, further comprising:
   in response to a request for incremental backup, generating a backup snapshot and a change tree, wherein the change tree is associated with a change tree logical inode ("LIN"), a change tree root directory, and a backup snapshot identifier associated with the backup snapshot.

3. The method of claim 1, wherein the set of LIN ancestors includes all ancestors of the LIN.

4. The method of claim 1, further comprising:
   in response to the generating the set of snapshot identifiers, flagging the LIN and the set of LIN ancestors with a painted identifier.

5. The method of claim 4, wherein the generating the set of snapshot identifiers is further based on the painted identifier of the LIN.

6. The method of claim 1, wherein the set of modifications to the LIN at least one of create or delete the LIN, and wherein the generating the set of snapshot identifiers includes removing snapshot identifiers associated with the LIN from the set of snapshot identifiers.

7. A non-transitory computer-readable medium comprising computer executable components stored thereon to perform the following acts:
   detecting a set of modifications to data associated with a logical inode ("LIN") of a file system;
   in response to the detecting, generating a set of snapshot identifiers associated with the LIN and a set of LIN ancestors;
   in response to the generating the set of snapshot identifiers, extracting a set of backup snapshot identifiers from the set of snapshot identifiers;
   pushing the LIN, the set of backup snapshot identifiers, and a latest system snapshot identifier as a file system change entry to a global FIFO queue; and
   processing the file system change entry of the global First In First Out ("FIFO") queue by
   determining a set of change trees associated with the set of backup snapshot identifiers of the file system change entry;
   adding a set of entries to each change tree in the set of change trees wherein an entry in the set of entries includes at least a LIN, a parent LIN, and the current snapshot identifier associated with the LIN, and wherein the set of entries includes at least entries for the LIN and LIN ancestors in the set of LIN ancestors; and
   determining if an existing entry in each change tree comprises a same LIN and a same parent LIN as an entry in the set of entries; wherein adding the set of entries includes overwriting existing entries based on the determining.

8. The non-transitory computer-readable medium of claim 7, further comprising:
in response to a request for incremental backup, generating a backup snapshot and a change tree, wherein the change tree is associated with a change tree logical inode ("LIN"), a change tree root directory, and a backup snapshot identifier associated with the backup snapshot.

9. The non-transitory computer-readable medium of claim 7, wherein the set of LIN ancestors includes all ancestors of the LIN.

10. The non-transitory computer-readable medium of claim 7, further comprising:
in response to the generating the set of snapshot identifiers, flagging the LIN and the set of LIN ancestors with a painted identifier.

11. The non-transitory computer-readable medium of claim 10, wherein the generating the set of snapshot identifiers is further based on the painted identifier of the LIN.

12. The non-transitory computer-readable medium of claim 7, wherein the set of modifications to the LIN at least one of create or delete the LIN, and wherein the generating the set of snapshot identifiers includes removing snapshot identifiers associated with the LIN from the set of snapshot identifiers.

* * * * *